(12) United States Patent
Macmillan

(10) Patent No.: US 7,057,905 B2
(45) Date of Patent: Jun. 6, 2006

(54) METHOD AND APPARATUS FOR POWER CONVERSION HAVING A FOUR-QUADRANT OUTPUT

(75) Inventor: Bruce Macmillan, Phoenix, AZ (US)

(73) Assignee: JL Audio, INC, Miramar, FL (US)

( * ) Notice: Subject to any disclaimer, the term of this patent is extended or adjusted under 35 U.S.C. 154(b) by 48 days.

(21) Appl. No.: 10/634,171

(22) Filed: Aug. 5, 2003

(65) Prior Publication Data

US 2005/0030768 A1    Feb. 10, 2005

(51) Int. Cl.
*H02M 3/335*    (2006.01)
(52) U.S. Cl. ....................................... 363/17
(58) Field of Classification Search ................. 363/17, 363/24, 25, 26
See application file for complete search history.

(56) References Cited

U.S. PATENT DOCUMENTS

| | | | |
|---|---|---|---|
| 4,186,437 A | 1/1980 | Cuk | |
| 4,245,286 A | 1/1981 | Paulkovich et al. | |
| 4,283,667 A * | 8/1981 | Dinger | 318/256 |
| 4,577,268 A | 3/1986 | Easter et al. | |
| 4,788,635 A * | 11/1988 | Heinrich | 363/35 |
| 5,654,881 A | 8/1997 | Albrecht et al. | |
| 5,903,448 A | 5/1999 | Davila, Jr. | |
| 5,923,545 A | 7/1999 | Nguyen | |
| 5,929,614 A | 7/1999 | Copple | |
| 6,166,513 A * | 12/2000 | Hammond | 318/764 |
| 6,205,035 B1 | 3/2001 | Vollmer et al. | |
| 6,222,352 B1 | 4/2001 | Lenk | |
| 6,236,579 B1 | 5/2001 | Watanabe et al. | |
| 6,429,629 B1 | 8/2002 | Nguyen | |
| 6,434,021 B1 | 8/2002 | Collmeyer et al. | |
| 6,437,999 B1 | 8/2002 | Wittenbreder | |
| 6,462,962 B1 | 10/2002 | Cuk | |

* cited by examiner

*Primary Examiner*—Adolf Berhane
(74) *Attorney, Agent, or Firm*—Akerman Senterfitt

(57) ABSTRACT

A power converter (10) operating in all four voltage-current quadrants includes an input voltage source (14), an output current independent of an output voltage and a switching arrangement (12, 16, 18, and 20) enabling an output terminal (26) to be in common with an input terminal. The output voltage can be unconstrained by an input voltage from the input voltage source.

20 Claims, 4 Drawing Sheets

US 7,057,905 B2

METHOD AND APPARATUS FOR POWER CONVERSION HAVING A FOUR-QUADRANT OUTPUT

CROSS-REFERENCE TO RELATED APPLICATIONS

Not applicable

FIELD OF THE INVENTION

This invention relates generally to power converters, and more particularly to a method and apparatus for providing power conversion having a four-quadrant output.

BACKGROUND OF THE INVENTION

There are a variety of switching power converters capable of four-quadrant output (where the output voltage can be positive, negative or zero, and the output current can also be positive, negative or zero). The majority are derived from a Buck topology. Buck converters are limited in that their maximum output voltage must be less than their input source voltage. In the case of two buck converters operated in a bridge, the maximum output voltage must be less than twice the input source voltage. In applications where the available input source voltage is fixed, an intermediate power conversion may be necessary to step up the available input voltage to achieve the required output voltage. This increases cost and complexity.

Four-quadrant converters have been made using a topology other than Buck to avoid this output-voltage limitation. U.S. Pat. No. 4,186,437 by Slobodan M. Cuk describes a novel four quadrant converter and a boost-derived four-quadrant converter. Both of these topologies have no theoretical limitation on their maximum output voltage. In both topologies, four-quadrant operation is achieved by operating two converters in phase-opposition and taking the output differentially across the outputs of the two converters in a bridge configuration. Due to the use of two converters in a bridge configuration and the resultant differential output, neither output terminal may be common with a terminal of the input voltage source. This lack of a common terminal prevents the desirable capability of combining the outputs of two such four-quadrant converters to a single load in a bridge configuration. Further, two or more inductors are required in either topology.

There are several converters that have some of the same elements of the present invention, but fail to function in a manner that would provide a four quadrant output and/or an unconstrained output signal. For example, U.S. Pat. No. 6,222,352 to Ronald J. Lenk ("Lenk") has three operational modes, each of which occurs for a controlled time. Lenk does this to independently control two different outputs. Each of the outputs in Lenk operates a single voltage-current output (positive voltage, positive current) as opposed to all four quadrants. Furthermore, each output in Lenk is constrained to be smaller than the input.

U.S. Pat. No. 6,429,629 to Tranh To Nguyen ("Nguyen") discusses converters that have a center-tapped wound magnetic element or transformer with a DC input applied to the center tap and switches from each winding end to ground. The converters in Nguyen only operate in one voltage-current quadrant (positive voltage, positive current or negative voltage, negative current) as opposed to all four quadrants. Once again, the output voltage magnitude is constrained by the input voltage. Nguyen states that the converters shown in FIGS. 3A–3J are capable of output of "any polarity and magnitude." However, it must be understood that all of the converters in Nguyen operate inherently in one quadrant depending on the direction of the diodes or synchronous rectifiers and that the output magnitude is constrained by the input voltage and turns ratio of the transformer.

SUMMARY OF THE INVENTION

An embodiment in accordance with the present invention can provide for a four-quadrant output from a single switching converter that has no theoretical limit on its output voltage and does not require the use of two converters. Further, one of the output terminals can be common with one of the terminals of the input voltage source as the output is single-ended, allowing the desirable combining of the outputs of two of the four-quadrant converters to a single load in a bridge configuration. Further, the embodiment can just use a single inductor with one, two, or more windings.

In one aspect of embodiments in accordance with the invention, a power converter operating in all four voltage-current quadrants comprises an input voltage source, an output current independent of an output voltage and a switching arrangement enabling an output terminal to be selectively in common with an input terminal. The output voltage can be unconstrained by an input voltage from the input voltage source.

In another aspect, a power converter operating in all four voltage-current quadrants can comprise an inductor having at least two windings where at least one set of respective common terminals of the windings are in opposite phase and an input voltage source selectively coupled to the inductor and to an output terminal of the power converter such that an output current remains independent of an output voltage and the output voltage is unconstrained by an input voltage from the input voltage source.

In yet another aspect, a method of power conversion comprises the steps of selectively converting an input signal to an output signal operating in any one of four voltage-current quadrants and selectively coupling at least one output terminal with an input terminal, where an output current is independent of an output voltage and the output voltage is unconstrained by an input voltage of the input signal.

DETAILED DESCRIPTION OF THE DRAWINGS

Figure 1:
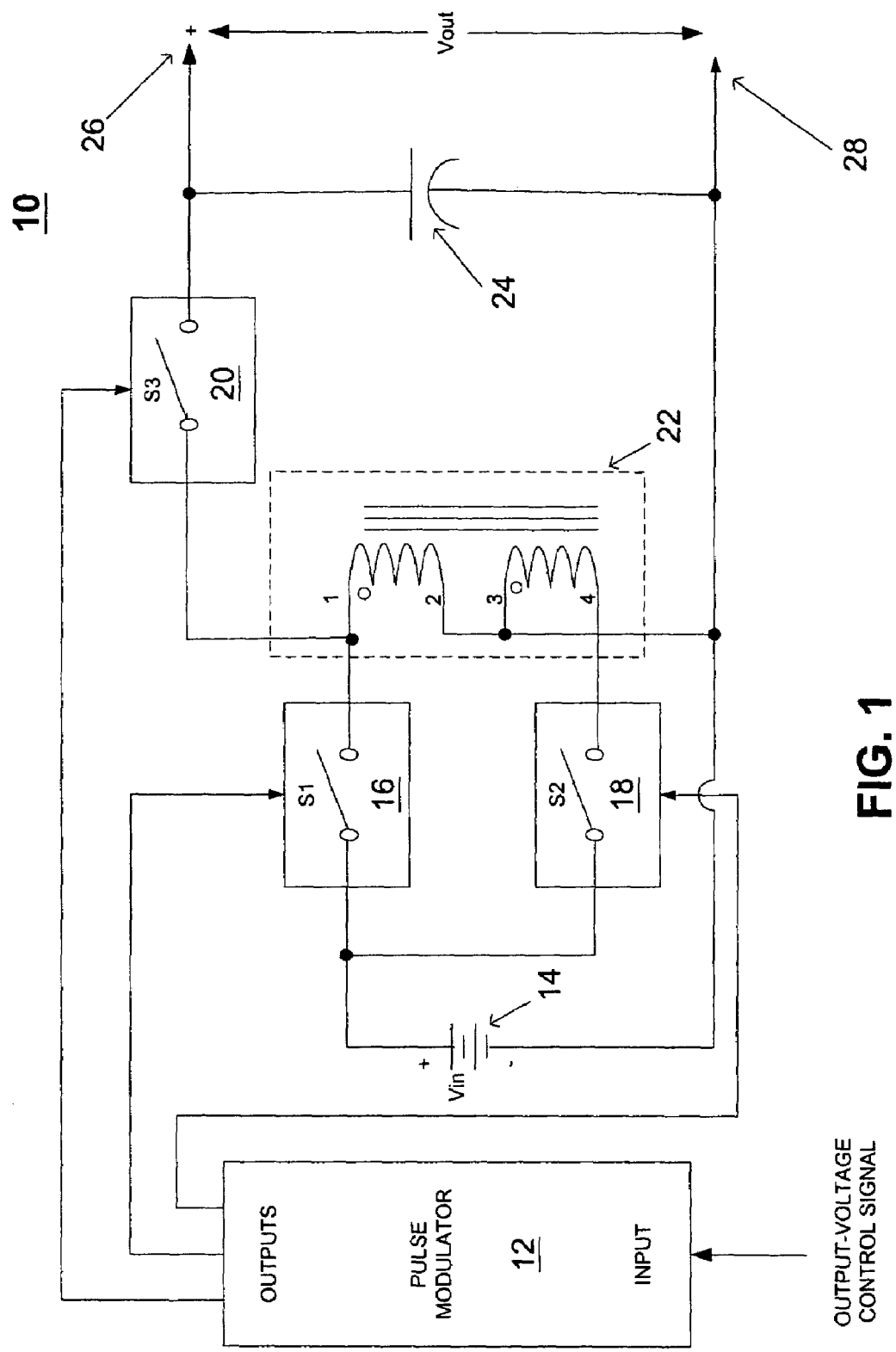
FIG. 1 is an electrical schematic block diagram of a power converter in accordance with the present invention

Referring to FIG. 1, an electrical schematic block diagram shows the elements of an embodiment of a power converter 10 in accordance with the present invention. An inductor 22 has two windings (having terminals 1–2 and 3–4) preferably having an equal number of turns and preferably being wound such that they are tightly-coupled magnetically, for example, in a bifilar manner. The windings are interconnected as shown, with the common terminals 2,3 being of opposite phase as indicated by the dots. The common terminal of the two windings preferably connects to one terminal of a voltage source 14 such as DC voltage source (Vin), in this case, to its negative terminal. Terminal 1 of the inductor 22 connects to bidirectional switch 16 (S1). The other terminal of S1 connects to the positive terminal of voltage source 14. In a like manner, terminal 4 of the inductor 22 connects to one terminal of bidirectional switch 18 (S2). The other terminal of S2 connects to the positive terminal of voltage source 14. One terminal of a third bidirectional switch 20 (S3), connects to terminal 1 of the inductor. Its other terminal connects to the positive output 26 of the converter. One terminal of a capacitor 24 connects to this positive output terminal. The other terminal of capacitor 24 connects to the negative output 28 or negative terminal of voltage source 14 which is also the negative output terminal of the converter. Capacitor 24 serves to filter the pulsating output current that flows when switch S3 is on, reducing output-voltage ripple at the switching frequency.

A Pulse Modulator circuit 12 generates signals that control bidirectional switches, in this instance, S1 through S3. These signals are such that S3 is on when neither S1 nor S2 is on and S1 and S2 may not be on at the same time. The switches can be operated in a cyclical sequence that preferably occurs at a constant frequency. The on-time of bidirectional switch S3 is preferably constant and must be less than the period of the sequence, that is, less than the reciprocal of its frequency. The sum of on-times of S1 and S2 is this period less the on-time of S3. Note, the pulse modulator circuit can be embodied using digital techniques and software. Also, the pulse modulator circuit and bidirectional switches can be embodied in integrated circuits, either combined or separately.

The relationships between the on times are stated below mathematically:

$$Ts1+Ts2+Ts3=K1 \quad (1)$$

$$Ts3=K2 \quad (2)$$

$$K2<K1 \quad (3)$$

Where Ts(a) is the on-time of switch (a) and K1 and K2 are constant times, the switching period and the on-time of switch S3 respectively.

An Output-voltage Control Signal is input to the Pulse Modulator that varies the on-times Ts1 and Ts2 of S1 and S2 respectively according to the above rules. Thus, if the on-time of S1 is increased in response to the input signal, the on-time of S2 must decrease by the same amount because the sum of all switch on-times is constant. The relationship between the input and output voltages Vin, Vout may be derived from the principle that, in the steady-state where there is no net change in inductor current over a switching cycle, the volt-second integral across an inductor winding 1–2 or 3–4 must be zero:

$$Vin \times Ts2 - Vin \times Ts1 - Vout \times Ts3 = 0 \quad (4)$$

where Vin and Vout have the reference polarities shown in FIG. 1.

The first two terms of (4) differ in sign because the winding 1–2 connected to switch S1 is in phase opposition to the winding 3–4 connected to S2.

After algebraic manipulation:

$$Vout=Vin \times [(Ts2-Ts1)/Ts3] \quad (5)$$

Note that the equations above correspond to an embodiment having windings with equal turns. Embodiments of the present invention can have windings with unequal turns and still operate fundamentally the same as described, except that the equations describing the operation would change. Having windings with equal turns is a special case of a more general one with unequal turns.

Three cases are of particular interest:

A. Where Ts1=0, Vout.=Vin×(Ts2/Ts3). This is the maximum positive output voltage, which is larger than Vin where Ts2>Ts3.

B. Where Ts2=0, Vout=Vin×(−Ts1/Ts3). This is the maximum negative output voltage, which has an absolute value larger than Vin where Ts1>Ts3.

C. Where Ts1=Ts2, Vout=0.

From these three cases it can be seen that the output voltage may be positive, negative, or zero, indeed, it make take on any value between the positive and negative limits determined in (A) and (B) above. Further, it can be seen that, as the absolute value of the time ratio in the brackets of equation (5) approaches infinity, the absolute value of the output voltage Vout also approaches infinity for any nonzero value of Vin, thus, the output voltage is not limited by the input voltage Vin.

The operation of the invention in limiting cases (A) and (B) may be understood with reference to conventional Buck-boost converters. In the case where Ts2=0, the bidirectional switch S2 and the inductor winding to which it connects may be removed from the circuit for analysis, which becomes a polarity-inverting Buck-boost converter that provides a negative output. In the case where Ts1=0, bidirectional switch S1 may be removed from the circuit for analysis, which then becomes a non-polarity inverting Buck-boost converter where inductor winding 3–4 is the input or primary winding and winding 1–2 becomes the output or secondary winding. The output is positive due to the phase relationship between the windings.

Between these two limit cases, both Ts1 and Ts2 are nonzero. In this mode there is no analog to known converters. From the discussion above, it is clear that the two inductor windings with their associated switches store energy in the inductor in opposite directions. The closure of S1 causes the current flowing into a reference-phase (dotted) inductor terminal to increase, while the closure of S2 causes the current flowing into a reference-phase (dotted) inductor terminal to decrease. The action of the switches S1 and S2 oppose each other and the net volt-second product across an inductor winding terminals 1–2 or 3–4 results from the difference in the switch on-times. Where S1 is closed for a longer time than S2, the net volt-second product across inductor terminals 1–2 is positive; where S2 is closed for a longer time than S1, the net volt-second product across inductor terminals 1–2 is negative. It is this net volt-second product that determines the polarity of the output voltage.

It will be noted that, if switch S3 and capacitor 24 are removed, the circuit of FIG. 1 is similar to the primary circuit of a push-pull Buck or forward converter with a center-tapped transformer primary that consists of two windings with an equal number of turns. The present invention differs from the push-pull Buck converter in that it controls and varies the magnitude and sign of the winding volt-second product and explicitly stores energy in an inductor which is transferred to an output. In the case of the Buck converter with a push-pull primary, the volt-second product is either not controlled, or if controlled, it is done such that the net volt-second product across either winding is minimized.

This minimization is necessary to prevent the saturation of the Buck-converter transformer core which is not designed to store a significant amount of energy. Further, in such a push-pull Buck converter, any energy stored in the transformer is not deliberately varied as a means to vary the output of the converter and delivered to the converter output as in the present invention.

Given that the switches used in the present invention are bidirectional, meaning that they can control current flow in both directions, power may flow from the input voltage source to the output, or into the output and to the input voltage source (Vin of FIG. 1). Thus, the labels "input" and "output" are arbitrary. An example of an application for the "reverse" power flow would be an AC-to-DC converter, such as a battery charger or power-factor correction circuit.

If the Output-voltage Control Signal input to the Pulse Modulator is AC, the output voltage will also be AC and the converter will function as an amplifier.

Figure 2:
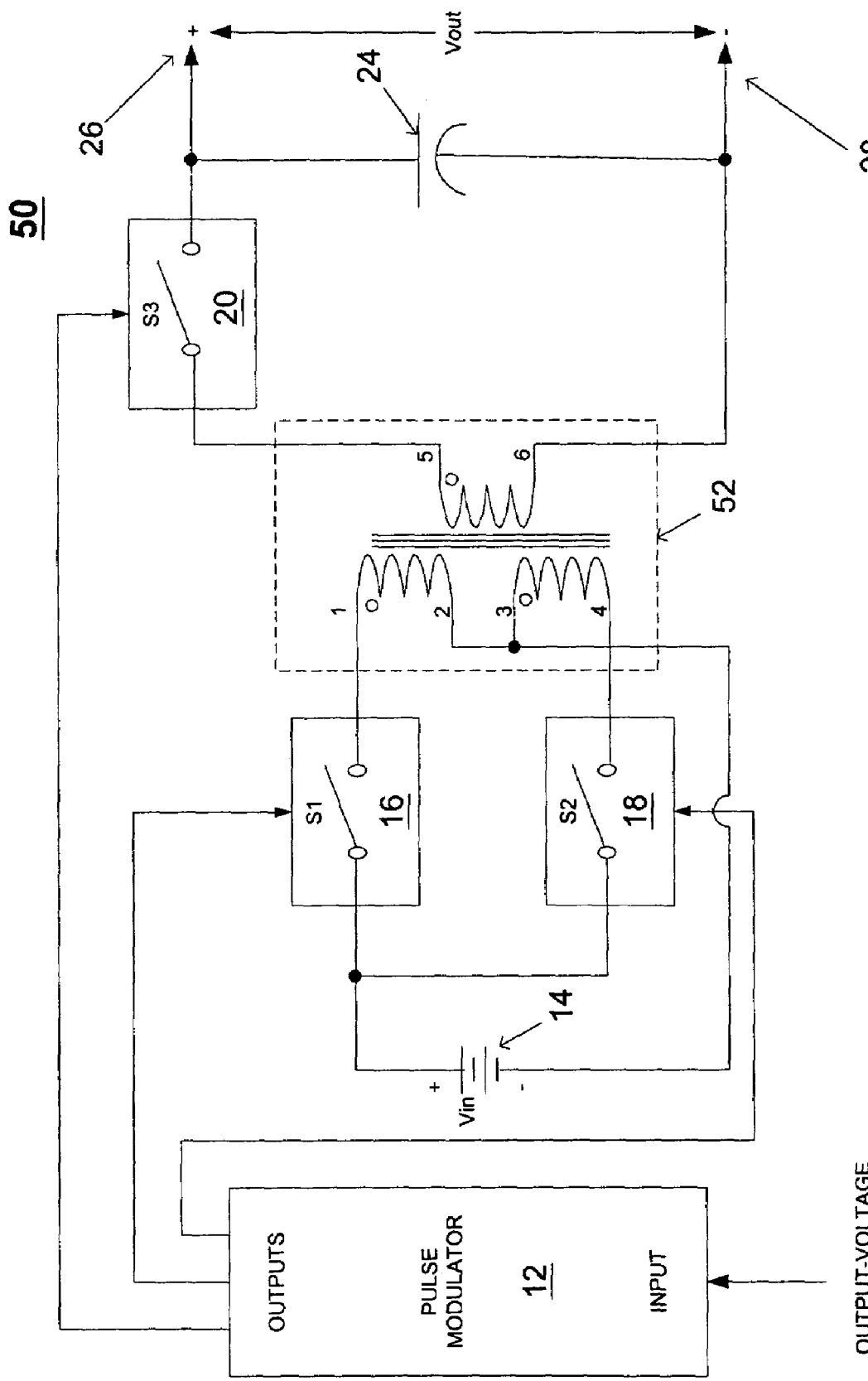
FIG. 2 is an electrical schematic block diagram of another power converter in accordance with the present invention.

Referring now to FIG. 2, a block diagram shows the elements of an other embodiment of a power converter 50 similar to power converter 10 of FIG. 1. Power converter 50 and power converter 10 can share many of the same elements including pulse modulator 12, voltage source 14, bidirectional switches 16, 18 and 20 as well as capacitor 24. In contrast though, power converter 50 includes an inductor 52 having a third inductor winding 5,6 in addition to the first (1,2) and second (3,4) inductor windings. Power converter 50 has an output that is electrically isolated from the input. This isolation is achieved by means of the third inductor winding 5,6 that connects only to the output. The pulse modulator 12 in FIG. 2 can be identical to the pulse modulator 12 of FIG. 1. Where the number of turns in this third winding is equal to the number of turns in windings 1–2 and 3–4, the relationship between input voltage, switch times, and output voltage is identical to power converter 10 of FIG. 1. Where the number of turns in output winding 5–6 is not equal to that of 1–2 and 3–4 the relationship between input voltage, switch times, and output voltage is changed as follows:

$$Vout = Vin \times N \times [(Ts2-Ts1)/Ts3]$$

where N is the ratio of the number of turns in winding 5–6 to the number of turns in both windings 1–2 and 3–4.

In the power converter 10 of FIG. 1, current is always flowing in either winding 1–2 or winding 3–4. In the power converter 50 of FIG. 2, when bidirectional switch 20 (S3) is closed, current ceases to flow in windings 1–2 and 3–4 and transfers to flow in winding 5–6. This behavior is much like that of a conventional isolated buckboost or Flyback converter.

Figure 3:
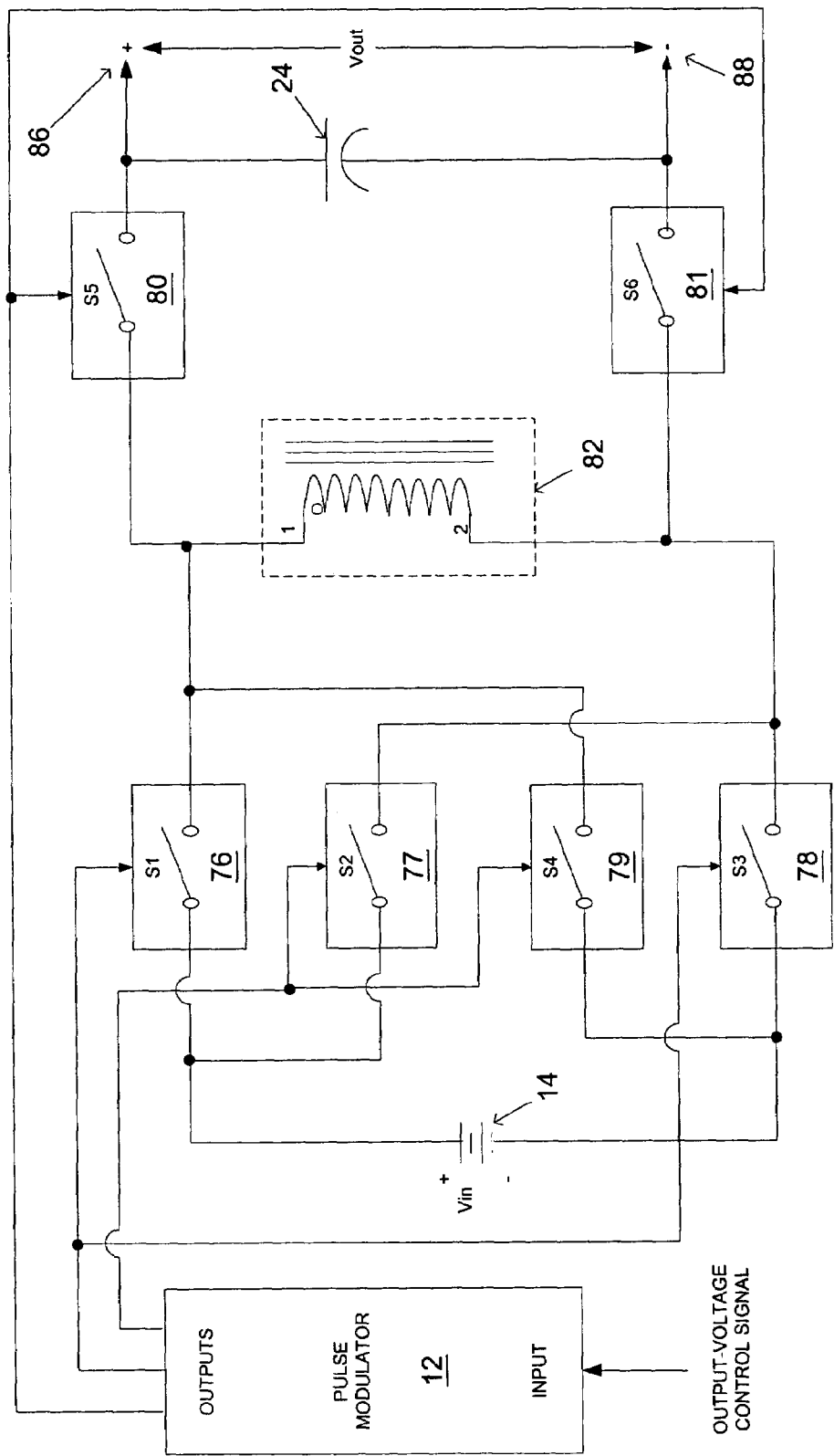
FIG. 3 is an electrical schematic block diagram of yet another power converter in accordance with the present invention.

With reference to FIG. 3, a block diagram illustrates yet another embodiment of a power converter 70 that can have many of the same elements as power converters 10 and 50 including pulse modulator 12, voltage source 14, and capacitor 24. Pulse modulator 12 of power converter 70 can be identical to the pulse modulator in converter 10 of FIG. 1. In contrast to the multi-winding inductors and (single) bidirectional switches used in power converters 10 and 50, power converter 70 uses an inductor 82 having a single winding (1–2) and a series of bidirectional switch pairs (76–81). Where power converter 10 of FIG. 1 uses two windings which are connected in opposing phase to the input voltage, FIG. 3 uses bidirectional switch pairs 76 & 78 (S1/S3) and 77 & 79 (S2/S4) to connect a single inductor winding (in inductor 82) to the input voltage in opposite polarities. Bidirectional switch pair 80 & 81 (S5/S6) connects the inductor winding 1–2 to the output. Switches 76 and 78 are opened and closed together, switches 77 and 79 are opened and closed together, and switches 80 and 81 are opened and closed together. The switch pair 76/78 (S1/S3) is analogous to switch 16 (S1) of FIG. 1, switch pair 77/79 (S2/S4) is analogous to 18 (S2) of FIG. 1, and switch pair 80/81 (S5/S6) is analogous to 20 (S3) of FIG. 1. One terminal of the bidirectional switch 80 (S5) connects to terminal 1 of the inductor 82. Its other terminal connects to the positive output 86. One terminal of bidirectional switch 81 (S6) connects to terminal 2 of inductor 82 while its other terminal connects to the negative output 28.

The closure of switches 76 (S1) and 78 (S3) causes the current flowing into the reference phase (dotted) inductor terminal to increase, while the closure of switches 77 (S2) and 79 (S4) causes the current flowing into the reference (dotted) inductor terminal to decrease. The actions of switch pairs 76/78 (S1/S3) and 77/79 (S2/S4) oppose each other and the net volt-second product across the inductor winding 1–2 results from the difference in these switch-pair on-times. Where S1 and S3 are closed for a longer time than S2 and S4, the net volt-second product across the winding 1–2 is positive. Where S2 and S4 are closed for a longer time than S1 and S3, the net volt-second product across the winding 1–2 is negative. Where S1 and S3 are closed for the same duration as S2 and S4, the net volt-second product across the winding 1–2 is zero. As with power converter 10 of FIG. 1, it is this net volt-second product that determines the polarity of the output voltage. The relationship between input voltage, switch times, and output voltage of the power converter 70 of FIG. 3 is identical to that of the power converter 70 of FIG. 1.

Unlike power converter 10, the output of power converter 70 is inherently isolated electrically from the input. However, either output terminal may be connected to either input terminal with no change in operation of the converter.

While the inductor 82 of FIG. 3 is simpler than inductor 22 of FIG. 1 or inductor 52 of FIG. 2 due its single winding, this improvement is offset by the added complexity of three additional bidirectional switches. Further, unlike power converter 50 of FIG. 2, where electrical isolation of the input and output is provided by separate inductor windings, the isolation of power inductor 70 is provided solely by the bidirectional switches (76–81).

Figure 4:
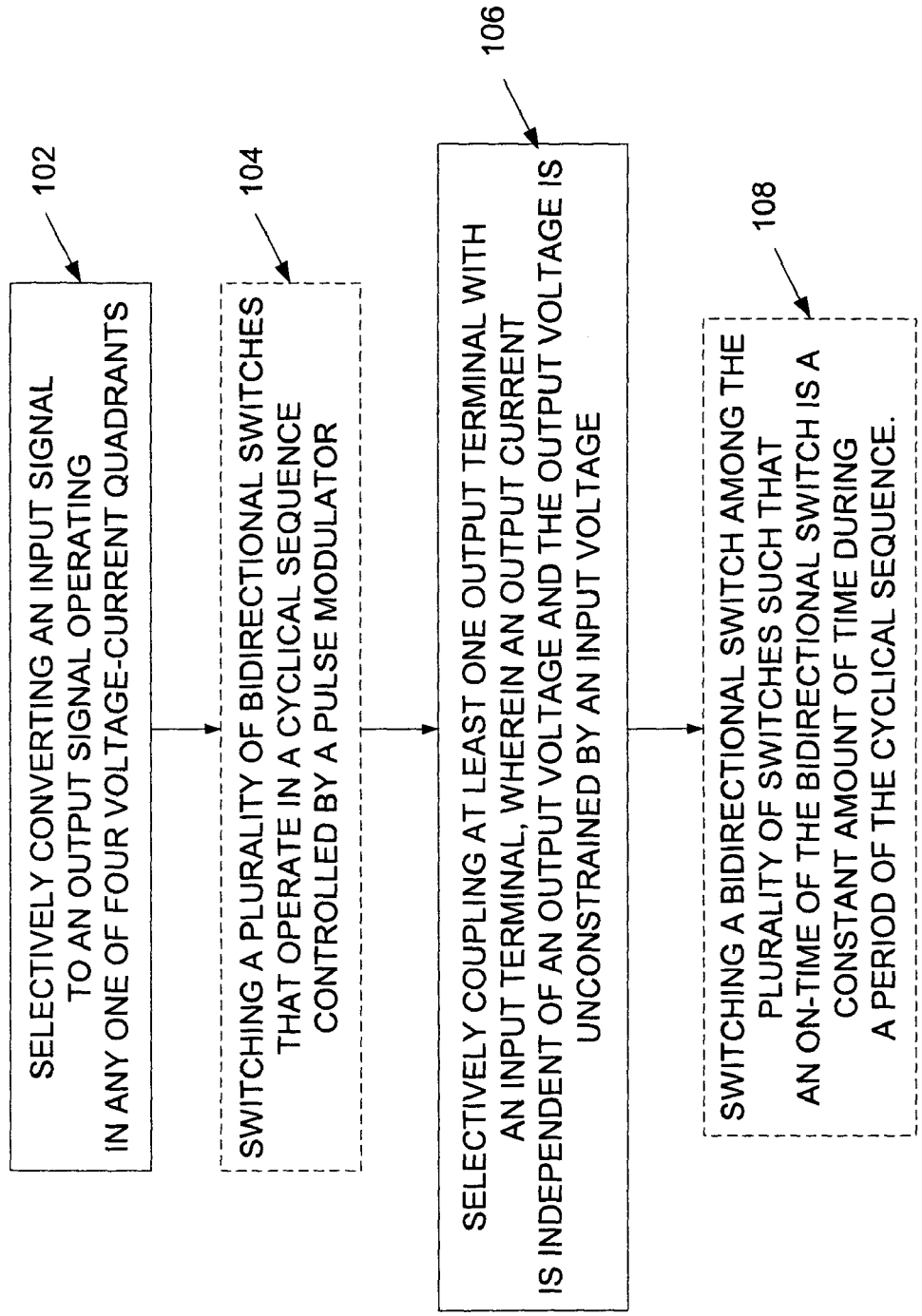
FIG. 4 is a flow chart illustrating a method of power conversion in accordance with the present invention.
Figure 1:
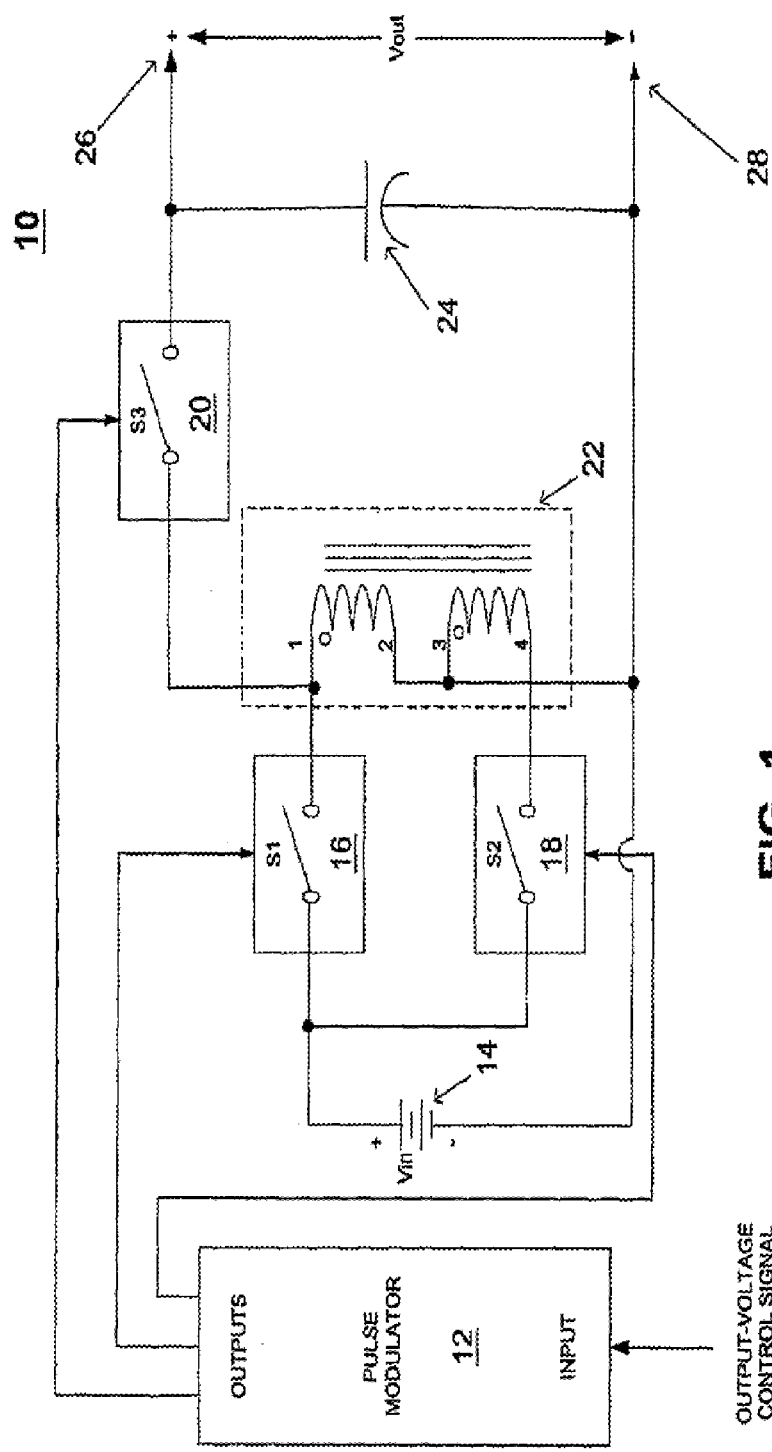

Referring to FIG. 4, a flow chart illustrating a method 100 of power conversion comprises the step 102 of selectively converting an input signal to an output signal operating in any one of four voltage-current quadrants and the step 106 of selectively coupling at least one output terminal with an input terminal, where an output current is independent of an output voltage and the output voltage is unconstrained by an input voltage of the input signal. The method 100 can optionally include the step 104 of switching a plurality of bidirectional switches that operate in a cyclical sequence controlled by a pulse modulator and the step 108 of switching a bidirectional switch among the plurality of switches such that an on-time of the bidirectional switch is a constant amount of time during a period of the cyclical sequence.

In light of the foregoing description of the invention, it should be recognized that the present invention can be realized in hardware, software, or a combination of hardware and software. A method and system for providing power conversion according to the present invention can be realized in a centralized fashion in one computer system or processor, or in a distributed fashion where different elements are spread across several interconnected computer systems or processors (such as a microprocessor and a DSP).

Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. A computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A power converter, comprising:
   an input voltage source;
   an output current independent of an output voltage, wherein the output voltage is unconstrained by an input voltage from the input voltage source and the power converter operates in all four voltage current quadrants; and
   a switching arrangement enabling an output terminal to be in common with an input terminal.

2. The power converter of claim 1, wherein the power converter further comprises a single inductor with two windings.

3. The power converter of claim 2, wherein the windings of the single inductor are tightly coupled magnetically.

4. The power converter of claim 2, wherein the switching arrangement comprises a plurality of bidirectional switches coupled to the singe inductor, wherein the plurality of bidirectional switches are controlled by a pulse modulator.

5. The power converter of claim 4, wherein the plurality of bi-directional switches comprises a first switch coupled to a first terminal of the single inductor and to a positive terminal of the input voltage source, a second switch coupled to another terminal of the single inductor and to the positive terminal of the input voltage source, and a third switch coupled the first terminal of the single inductor and to the output terminal.

6. The power converter of claim 5, wherein the power converter further comprises a capacitor coupled between the output terminal and a negative terminal of input voltage source, wherein the capacitor filters a pulsating output current that flows when the third switch is turned on.

7. The power converter of claim 5, wherein the pulse modulator controls the plurality of switches such that the third switch is on when neither the first switch nor second switch is on and such that the first switch and the second switch cannot be on at the same time.

8. The power converter of claim 5, wherein the plurality of switches operate in a cyclical sequence and at a constant frequency.

9. The power converter of claim 8, wherein the on-time of the third switch is constant and less than a period of the cyclical sequence.

10. The power converter of claim 5, wherein the closure of the first switch causes current flow into a reference phase inductor terminal to increase while the second switch causes current flow into a second reference phase inductor terminal to decrease such that a greater on-time among the first switch and the second switch determines the polarity of the output voltage.

11. The power converter of claim 1, wherein the power converter can operate as at least one among the group comprising a buck-boost converter, an AC-to-DC converter, and an amplifier.

12. The power converter of claim 1, wherein the power converter further comprises a single inductor with at least one winding and wherein the switching arrangement enables the output terminal to be selectively in common with the input terminal.

13. The power converter of claim 1, wherein the power converter further comprises a single inductor having a single winding and wherein the switching arrangement comprises a plurality of bidirectional switch pairs coupled to the single inductor.

14. A power converter, comprising:
   an inductor having at least two windings wherein at least one set of respective common terminals of the windings are in opposite phase;
   an input voltage source selectively coupled to the inductor and to an output terminal of the power converter such that an output current remains independent of an output voltage and the output voltage is unconstrained by an input voltage from the input voltage source; and
   wherein the power converter operates in all four voltage current quadrants.

15. The power converter of claim 14, wherein the input voltage source is selectively coupled to the transformer using a plurality of bidirectional switches coupled to the transformer, wherein the plurality of bidirectional switches are controlled by a pulse modulator.

16. The power converter of claim 15, wherein the plurality of bi-directional switches comprises a first switch coupled to a first terminal of the transformer and to a positive terminal of the input voltage source, a second switch coupled to another terminal of the transformer and to the positive terminal of the input voltage source, and a third switch coupled the first terminal of the transformer and to the output terminal.

17. The power converter of claim 16, wherein the power converter further comprises a capacitor coupled between the output terminal and a negative terminal of input voltage source, wherein the capacitor filters a pulsating output current that flows when the third switch is turned on.

18. A method of power conversion, comprising the steps of:
   selectively convening an input signal to an output signal operating in four voltage-current quadrants; and
   selectively coupling at least one output terminal with an input terminal, wherein an output current is independent of an output voltage and the output voltage is unconstrained by an input voltage of the input signal.

19. The method of power conversion of claim 18, wherein the step of selectively converting the input signal to the output signal comprises switching a plurality of bidirectional switches controlled by a pulse modulator.

20. The method of power conversion of claim 18, wherein the step of selectively coupling the at least one output terminal with the input terminal comprises switching a bidirectional switch among a plurality of switches that operate in a cyclical sequence such that an on-time of the bidirectional switch is a constant amount of time during a period of the cyclical sequence.

* * * * *

UNITED STATES PATENT AND TRADEMARK OFFICE
CERTIFICATE OF CORRECTION

PATENT NO.       : 7,057,905 B2
APPLICATION NO. : 10/634171
DATED            : June 6, 2006
INVENTOR(S)      : Bruce Macmillan It is certified that error appears in the above-identified patent and that said Letters Patent is hereby corrected as shown below:

We also respectfully request that a minus (-) sign be inserted in Fig. 1, in connection with item 28 as shown in attached sheet.

Column 2, line 50, insert a period --"."-- after "invention"

Column 4, line 17, replace "make" with --may--

Column 6, line 38, insert --to-- after "due"

Column 7, line 39, replace "singe" with --single--

Column 7, line 47, insert --to-- after "coupled"

Column 8, line 49 replace "convening" with --converting--

Signed and Sealed this

Twenty-eighth Day of November, 2006

JON W. DUDAS
*Director of the United States Patent and Trademark Office*